UNITED STATES PATENT OFFICE.

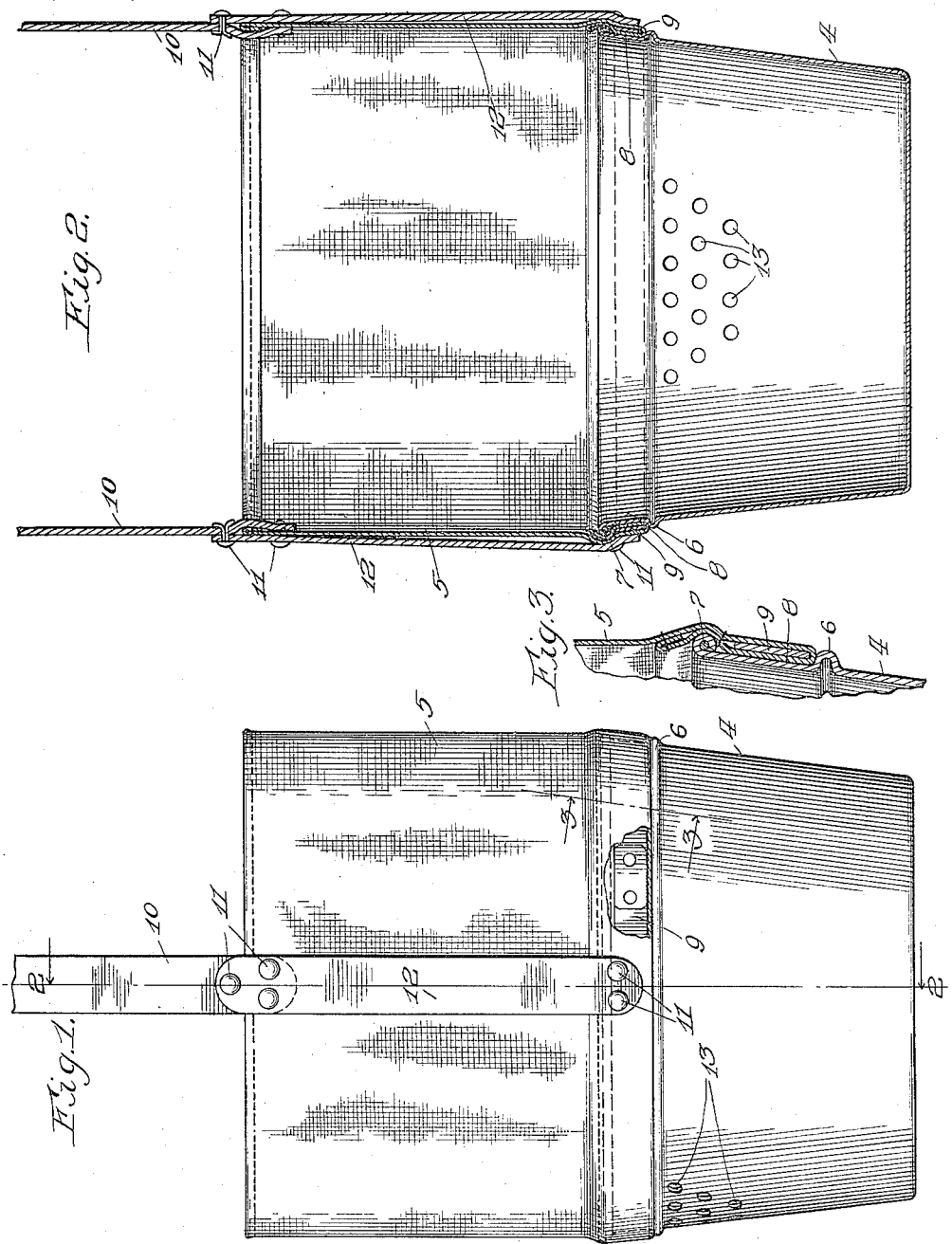

ADOLPH G. BADE, OF CHICAGO, ILLINOIS.

FEED-BAG.

1,167,614.   Specification of Letters Patent.   Patented Jan. 11, 1916.

Application filed October 30, 1914. Serial No. 869,388.

*To all whom it may concern:*

Be it known that I, ADOLPH G. BADE, a citizen of the United States, residing at Chicago, in the county of Cook and State of Illinois, have invented a new and useful Improvement in Feed-Bags, of which the following is a specification.

My invention relates to feed bags for animals, and has for its object the provision of a device of the character mentioned which is simple in construction, efficient in use and adapted to be easily kept clean and sanitary.

Other objects will appear hereinafter.

The invention consists substantially in the combination and arrangement of parts hereinafter described and claimed, and will be readily understood by referring to the accompanying drawing, in which—

Figure 1 is a side elevation of a feed bag embodying my invention, a portion of the supporting strap being broken away and a fragment broken out of the bag in order to disclose underlying parts; Fig. 2 is a section taken on line 2—2 of Fig. 1, and Fig. 3 is an enlarged fragmental section taken on line 3—3 in Fig. 1.

My feed bag comprises a lower portion 4, preferably made of sheet metal and struck up from a single piece. However, when so desired, it may be made in more than one piece, without departing from my invention. Above the portion 4 is provided an upper portion 5 formed of a flexible material such as canvas or the like, and secured to the upper edge of lower portion 4 in a suitable manner. The manner I prefer to employ is two ribs or ridges 6 and 7, spaced apart and formed on the outer top edge of lower portion 4, making a channel between the ridges. I have shown the ridge 6 as being a bead struck up in the metal of the lower portion 4, and the ridge 7 formed by turning a wire in around the top edge of lower portion 4. These ridges may, however, be made in any suitable manner in order to form a channel therebetween to which the upper portion is secured.

Around the lower edge of upper flexible portion 5, I provide a hem 8, and in the hem is disposed a hoop 9. The hoop 9 is of such a size that it will just slip over the ridge 6 through the application of considerable force so that it will not become displaced in use, and of a size too small to pass over ridge 7, so that it will be impossible to slip the upper portion 5 upwardly away from the lower portion 4. In order to place the upper portion in position on the lower portion, or remove it therefrom, the hoop 9 and the hem 8 are passed over ridge 6 into the channel between ridges 6 and 7. This arrangement provides a simple connection between the portions and one which permits the portions to be easily separated when it is so desired.

Secured to the upper edges at opposite sides of flexible upper portion 5, I provide a supporting strap 10, a portion of which is broken away in the drawings, securing its ends to said upper portion by means of rivets 11. However, this strap may be secured in any suitable or desirable manner. The strap 10 may be extended downwardly and secured to the hem 8, or, when preferred, separate straps 12 may be secured to strap 10 at their upper ends and to the hem 8 at their lower ends, as indicated in the drawing.

The lower rigid portion serves as a means for maintaining the bag in extended position, so that the animal may always have access to the food placed in the bag, when in use, and the upper flexible portion, being yielding, will prevent the food from being thrown out as the animal feeds. The flexible portion also provides a yielding upper edge to the device, so that the latter will not injure the animal, in use. I prefer to form the lower portion in one piece, as illustrated, so that when it is detached from the upper portion it may be easily washed or otherwise cleaned, to render it in a sanitary condition. Furthermore, by providing no seams or sharp corners in this lower portion, there is no place for dirt to accumulate in the device.

I prefer to make the hoop 9 of strap material, and preferably of metal, in order to provide a wide securing means and one which will fit snugly between the ridges 6 and 7. Also, I have found that in making a hoop of flat material and riveting it, as indicated in Fig. 1, a more substantial and efficient hoop is provided.

I provide perforations 13 in the front side, near the upper edge of the lower portion 4, in order to provide the animal with sufficient air during its feeding and also as a means for permitting air to enter the lower portion of the device when not in use, to provide a current of air through the device. This establishes a means conducive to maintaining the bag in sweet condition.

While I have illustrated and described the preferred form of construction, I do not desire to limit myself to this particular form, but desire to avail myself of such variations and changes as come within the scope of the appended claims.

I claim:

1. A feed bag comprising a lower portion of substantially rigid material and having two spaced outwardly extending ridges around its upper edge providing a channel therebetween, the upper of the ridges being of a larger diameter than the lower; an upper portion of flexible material having its lower end extending over the upper of said ridges and disposed in the channel, the lower edge of the upper portion being bent back upon itself on its inner side and secured thereto forming a hem; and an annular hoop in said hem and disposed between said ridges, the hoop being of a size permitting it to pass over the lower of the ridges through the application of considerable force and too small to pass over the upper of the ridges.

2. A feed bag comprising a lower portion having two spaced outwardly extending ribs around its upper edge, and an upper portion extending downwardly over the upper of said ribs and having its lower edge disposed between said ribs, the lower edge of said upper portion being of a size adapted to pass over the lower of said ribs through the application of considerable force and too small to pass over the upper of said ribs.

3. A feed bag comprising a lower portion having two spaced outwardly extending ribs around its upper edge; an upper portion extending downwardly over the upper of said ribs and having its lower edge disposed between said ribs; and a hoop secured to the lower edge of the upper portion and of a size adapted to pass over the lower of said ribs through the application of considerable force and too small to pass over the upper of said ribs.

In testimony whereof I have signed my name to this specification, in the presence of two subscribing witnesses, on this 28th day of October, A. D. 1914.

ADOLPH G. BADE.

Witnesses:
CHARLES M. NISSEN,
ALLENA OFFUTT.

Copies of this patent may be obtained for five cents each, by addressing the "Commissioner of Patents, Washington, D. C."